Oct. 9, 1923.
R. O. HELLWARTH
TRANSMISSION MECHANISM
Filed Sept. 25, 1922    4 Sheets-Sheet 1
1,470,078
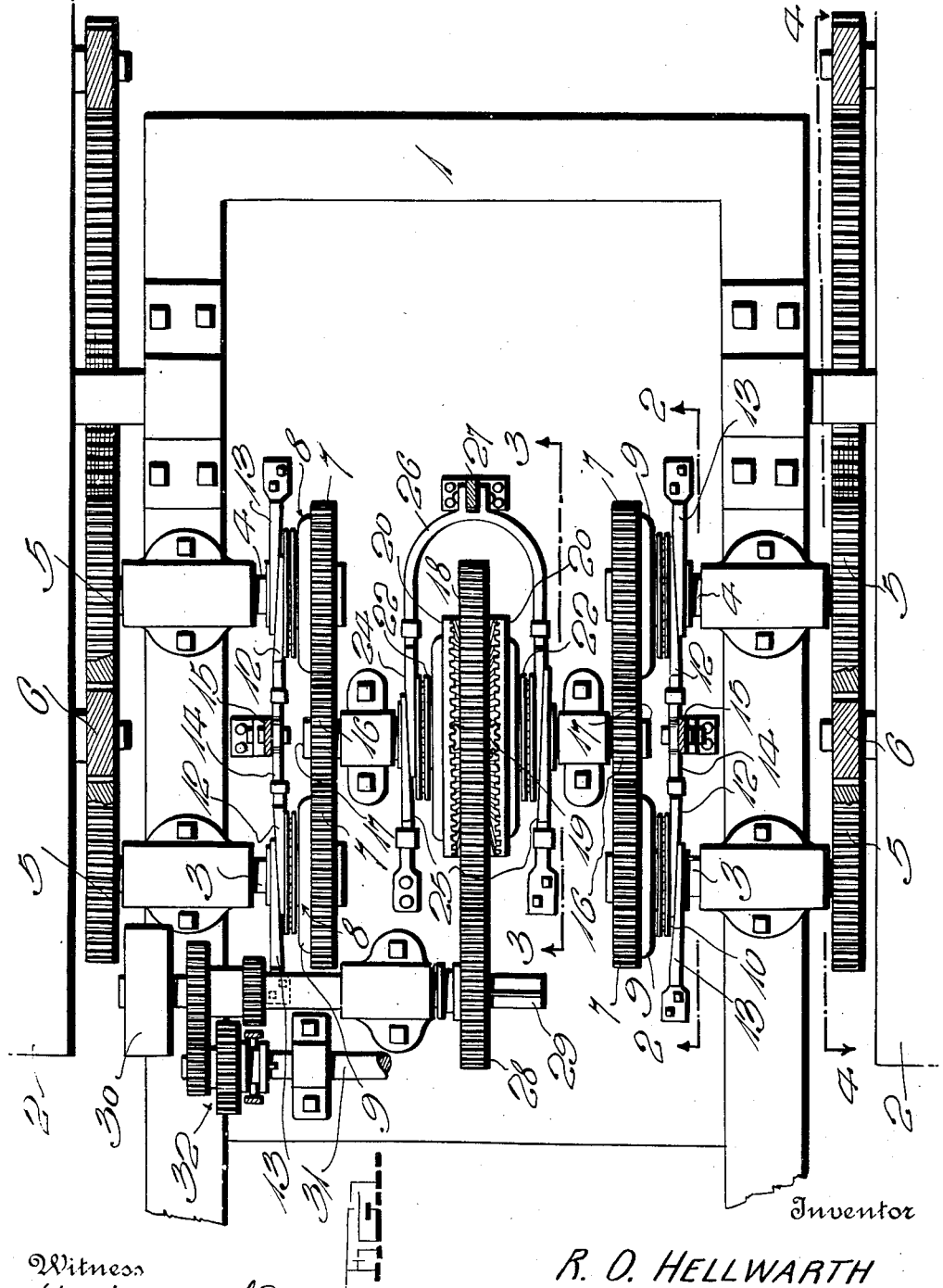
Inventor
R. O. HELLWARTH
Witness
H. Woodard
By H. B. Wilson &co
Attorneys

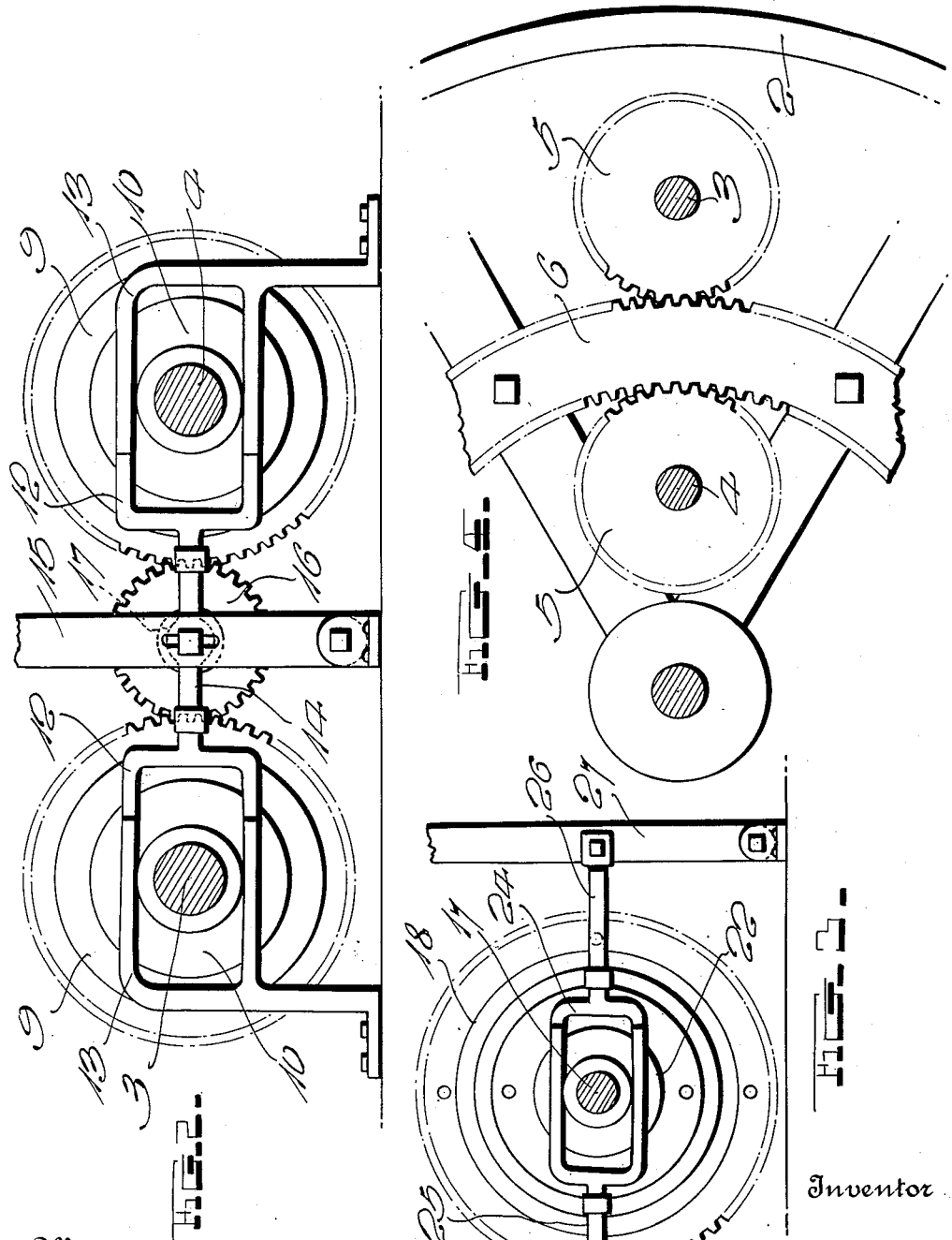

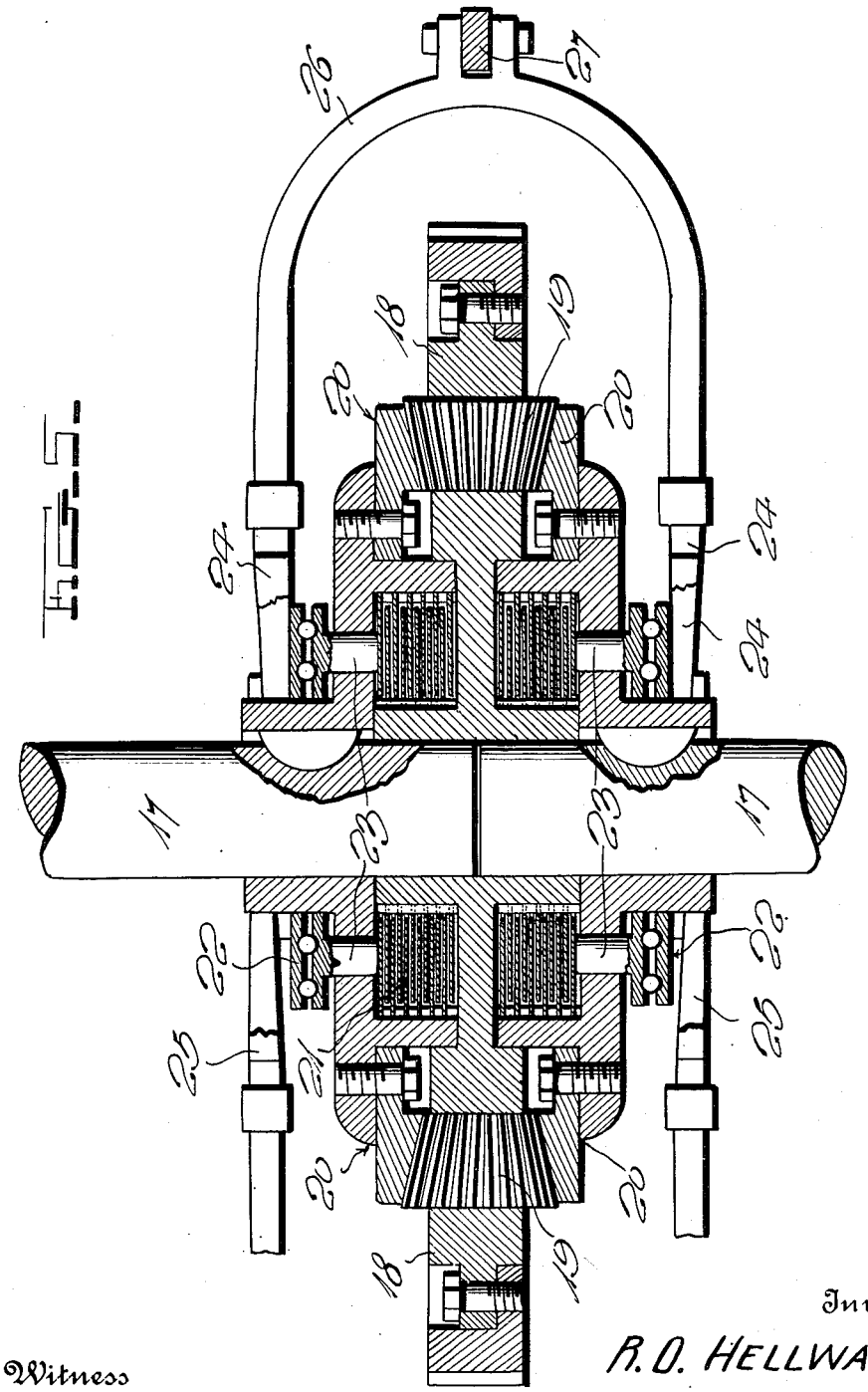

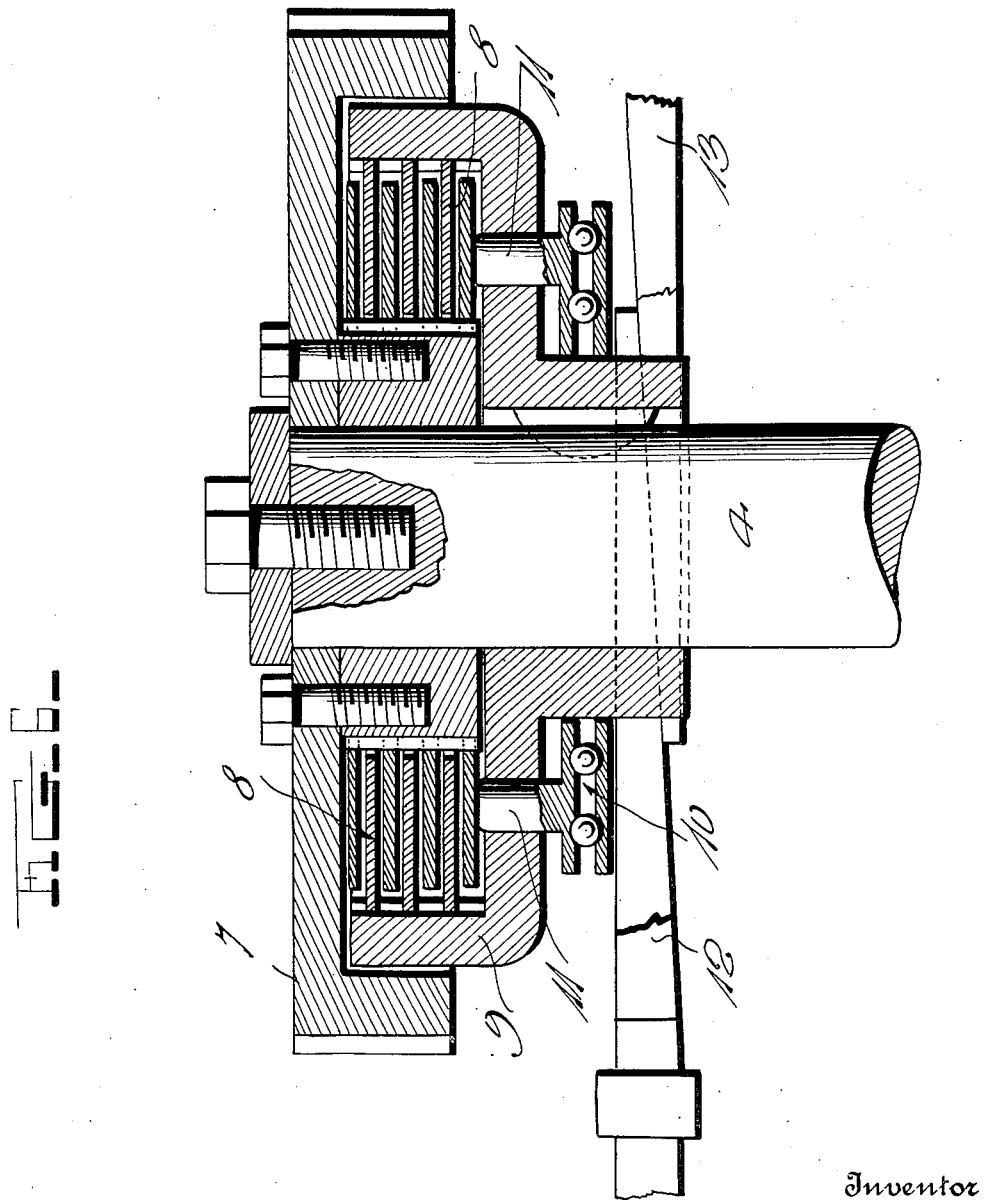

Patented Oct. 9, 1923.

1,470,078

UNITED STATES PATENT OFFICE.

RUSSELL O. HELLWARTH, OF CELINA, OHIO.

TRANSMISSION MECHANISM.

Application filed September 25, 1922. Serial No. 590,510.

*To all whom it may concern:*

Be it known that I, RUSSELL O. HELL-WARTH, a citizen of the United States, residing at Celina, in the county of Mercer and State of Ohio, have invented certain new and useful Improvements in Transmission Mechanisms; and I do declare the following to be a full, clear, and exact description of the invention, such as will enable others skilled in the art to which it appertains to make and use the same.

My invention relates to improvements in transmission mechanisms such as those designed primarily for use upon tractors, although usable also for trucks and other forms of machines.

The transmission is of the type adapted for driving right and left hand traction wheels or tread chains in reverse directions to produce abrupt steering or turning and the principal object is to provide a mechanism of this character having a differential driving mechanism which permits relative speed changes of the right and left hand traction members during ordinary steering with a suitable steering gear, but provided with means whereby the differential may be locked when abrupt turning is to be effected, whereby after setting suitable controls for the transmission units of the right and left hand traction members, one of the members may be positively driven forwardly while the other is similarly driven in the reverse direction, whereby the machine may be turned completely around or to any desired extent.

In carrying out the above ends, I provide a forward driving and a rearward driving shaft for each of the traction members and a further object is to provide a novel arrangement of parts whereby either shaft may be operatively connected with the differential mechanism and the other shaft simultaneously disconnected therefrom.

Still further objects are to provide a novel form of differential lock and to provide a conveniently located power take-off pulley which may be driven at will from the differential mechanism, without the necessity of driving the transmission mechanism.

With the foregoing in view, the invention resides in the novel subject matter hereinafter described and claimed, the description being supplemented by the accompanying drawings.

Figure 1 is a plan view of a transmission mechanism constructed in accordance with my invention, showing one manner of applying the same to a tractor.

Figures 2, 3 and 4 are vertical longitudinal sectional views as indicated by the lines 2—2, 3—3 and 4—4 of Fig. 1, respectively.

Figure 5 is an enlarged horizontal sectional view through the differential mechanism and its locking means.

Figure 6 is an enlarged horizontal section through one of the clutches which are used for connecting the forward and rearward driving shafts operatively with the differential mechanism.

In the drawings above briefly described, the numeral 1 designates a tractor frame shown more or less diagrammatically, said frame being provided with right and left hand traction members which are here shown in the form of wheels 2, although endless tread chains might well be employed instead. I provide independent driving units for the two traction members each including a forward driving shaft 3 and a rearward driving shaft 4, the two shafts being disposed in parallel relation and having bull pinions 5 on their outer ends connecting with the teeth on the inner and outer peripheries of a bull ring 6, one of these rings being secured to each traction member 2. Spur gears 7 are loosely mounted upon the inner ends of the shafts 3 and 4 and suitable clutches, such as the disc clutch 8 detailed in Fig. 6, are employed for locking said gears to their respective shafts. Each of these clutches includes a shell 9 keyed upon the shaft, a ball bearing thrust collar 10 around the hub of the shell, and studs 11 extending from this collar through the shell to move the clutch discs which are contained within said shell, into operative engagement with each other. Forked wedges 12 cooperating with ridged forked thrust members 13 carried by the frame 1, are employed to force the collar 10 inwardly to operative position, and the wedges 12 of each driving unit are preferably carried by opposite ends of a common operating rod 14, the arrangement being such that when this rod is shifted, for instance by the hand lever 15, or any other suitable means of control, to throw the clutch 8 of the shaft 3 into play, the clutch of the shaft 4 will be simultaneously thrown out. Thus, it will be seen that the bull pinions 5 may be controlled to drive the traction members 2 in either direction and as separate controls are provided for the two traction units, one traction member may be driven forwardly and the other reversely, to produce abrupt turning.

The gears 7 of the two driving units mesh with opposite sides of driving pinions 16 carried by the ends of shaft sections 17 which are connected by a differential mechanism detailed more particularly in Fig. 5. In this view, the numeral 18 designates a central floating driving ring carrying the usual radially disposed bevelled pinions 19 which mesh with the teeth of a pair of bevelled gears 20 which are keyed upon the shaft sections 17. The action of this arrangement is well known to produce relative speed changes of the two sections 17, for instance when one must travel faster than the other for ordinary steering, by means of a suitable steering gear (not shown). When the traction members 2 are employed for steering however it is necessary that the differential be locked so that the two shaft sections 17 will rotate as a single shaft. To obtain this result, I prefer to confine a pair of disc clutches 21 between the gears 20 and web of the floating gear 18. To operate these clutches, I provide clutch collars 22 at the ends of the differential mechanism, said collars being preferably of the ball bearing type and having studs 23 which extend through the gears 20 to move the clutch discs into operative relation with each other. For simultaneously operating both collars 22 to throw the clutches 21 into play, I provide two forked wedges 24 straddling the hubs of the gears 20 and contacting with the outer sides of said collars, said wedges 24 being cooperable with fixed thrust forks 25. The two wedges 24 are preferably carried by the ends of a U-shaped yoke 26 suitably connected with a hand lever or the like 27 and it will be understood that the arms of the yoke are jointed to permit the wedges 24 to move inwardly to some extent when forcing the collars 22 to operative position.

Any preferred means could of course be connected with the driving gear 18 for operating the differential mechanism, but this gear is preferably of the spur type meshing with a similar gear 28 on a transverse jack shaft 29 having a power take off pulley 30. By suitable means not shown, the gear 28 may be moved out of mesh with the gear 18 when only the pulley is to be used, without moving the machine forwardly or rearwardly. For rotating the shaft 29, I have shown suitable engine driven shaft 31 and variable speed gearing 32.

By providing the construction shown and described or substantially this construction, a very advantageous machine is provided. It will be seen that when the machine is being driven for instance along the roadway and the usual steering gear (not shown) is employed, the differential mechanism will remain free so as to allow any necessary variations in the speed of the two traction members 2, thereby producing easy steering. If an abrupt turn is to be made, however, the traction members 2 may be driven in opposite directions, by operating the levers 15 to set the clutches 8 so that the forward driving shaft 3 of one traction member operates and the rearward driving shaft 4 of the other traction members comes into play. Thus, the machine may be turned directly around or to any desired extent, it being understood however that before this turning operation will be carried out, it is necessary to lock the differential mechanism by shifting the lever 27 to throw the clutches 21 into play. In some instances, it may be desirable to drive one traction member either forwardly or rearwardly while having the other member free of all driving connections. When this is desired, the clutches 8 of one of the driving units may be set in a neutral position while one of the clutches of the other unit is thrown into play.

As excellent results may be obtained from the general arrangement shown and described, it is preferably followed, but within the scope of the invention as claimed, numerous minor changes may of course be made.

I claim:

1. A transmission mechanism comprising two transmission units adapted to be connected respectively to right and left traction members, each of said units including a forward driving shaft and a rearward driving shaft, an endless traction member carried element having a portion extending between said shafts and having operative connection therewith and means whereby either shaft may be thrown into play for imparting movement to the traction member, a differential, and mechanism associated with the differential for driving said transmission units at the same speed, regardless of the direction of drive.

2. A transmission mechanism comprising two transmission units adapted to be connected respectively to right and left traction members, each of said units including a forward driving shaft, a rearward driving shaft, an endless traction member carried element having a portion passing between said drive shafts and having operative connection therewith, gears loose upon said shafts respectively, and means for clutching either gear to its respective shaft while permitting the other gear to run free; a pair of shaft sections having gears meshing with said loose gears, a driven mechanism connecting said shaft sections and permitting relative speed changing thereof when steering, and means for locking said shaft sections together for rotation in unison at the same speed when desired.

3. A structure as specified in claim 2; said means for clutching either gear to its respective shaft comprising a wedge operated clutch for each gear, and a single movable member carrying the wedges for both clutches.

4. A transmission mechanism comprising a pair of internally and externally toothed bull rings adapted to be secured to right and left hand traction members respectively, inner and outer bull pinions meshing respectively with the inner and outer teeth of said bull rings, and means for driving both outer or both inner bull pinions simultaneously in the same direction, or for simultaneously driving one outer and one inner bull pinion in opposite directions.

5. The structure of claim 4 having the bull pinions mounted upon shafts, and means for imparting rotary movement to the shafts including clutch elements and means for causing movement of the clutch elements into and out of position causing rotation of the bull pinion carrying shafts.

In testimony whereof I have hereunto affixed my signature.

RUSSELL O. HELLWARTH.